Patented May 26, 1931

1,806,973

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD FOR PRODUCING HIGH GRADE ROSIN

No Drawing.  Application filed October 24, 1927.  Serial No. 228,501.

My invention relates to a method for producing high grade rosin.

The method in accordance with my invention depends upon my discovery that if a dark colored rosin, as for example, wood rosin or a dark gum rosin, be treated with a low boiling hydrocarbon, as a low boiling petroleum hydrocarbon, a separation of relatively pure or high grade rosin from the impurities and color bodies of the dark colored rosin may be effected, through the selective solvent action of the low boiling hydrocarbon for the relatively pure rosin. The high grade rosin may be readily recovered from solution in the low boiling hydrocarbon.

In the carrying out of the method in accordance with my invention the dark colored rosin may be in the form in which it is usually recovered, or it may be preliminarily or partially refined by any well known method.

In carrying out the method in accordance with my invention the dark rosin is preferably treated directly, but it may be treated in concentrated solution in a suitable solvent, as, for example, gasoline, or other light petroleum hydrocarbon, or operative equivalent thereof by adding a large volume of a low boiling hydrocarbon, having a selective solvent action on the relatively pure rosin, to the concentrated rosin solution, which results in the precipitation of color bodies insoluble in the low boiling hydrocarbon. According to my invention the treatment of the dark colored rosin may be carried on under atmospheric pressure at a temperature near the boiling point of the hydrocarbon, or with heat and pressure.

In the treatment of the dark colored rosin, I use a low boiling petroleum hydrocarbon or a mixture of low boiling hydrocarbons, for example, a hydrocarbon which will boil below 15° C. at atmospheric pressure, or a mixture of hydrocarbons, the greater proportion of which will boil below 15° C. at atmospheric pressure, preferably a paraffin hydrocarbon, such as iso-butane, b. p. −10° C., n-butane, b. p. 1° C., propane, b. p. −44° C, butylene b. p. −5° C or propylene, b. p. −47° C, in liquid form. Liquid ethane, b. p.—84° does not dissolve rosin at atmospheric pressure, but if the temperature and pressure are increased sufficiently it exerts a solvent action; for example, ethane at room temperature and under a pressure of about 500 lbs. will dissolve rosin.

As an example of the carrying out of the method according to my invention, 100 parts of dark colored rosin, for example, wood rosin, is subjected to treatment with 1200 parts of liquid butane in a closed system, at (say) about 1° C. under atmospheric pressure. The butane will act to selectively dissolve substantially pure rosin from the dark rosin leaving undissolved the color bodies, oxidized rosin and other impurities. The butane and rosin may be heated to (say) 60° C. under pressure of about 100 pounds to facilitate the dissolving of the substantially pure rosin. After a period of about one hour the butane solution is cooled, if heat was applied, and drawn off from the undissolved portion of the dark rosin, or nigre, including the color bodies, and the butane evaporated and condensed under pressure, leaving about 75 parts of refined rosin, which will grade about N. The treatment may be carried on in any suitable form of apparatus, it being only necessary that the apparatus be arranged in a closed system to prevent loss of the solvent. If desired the butane may be condensed by absorption in activated carbon or other medium.

The rosin produced in accordance with my invention will be of high grade and in particular will be largely freed from color bodies and other impurities which gave a dark color to the rosin, or which cause wood rosin to darken in the presence of an alkali and oxygen, as when the rosin is used in the production of soap.

In connection with the practice of the method in accordance with my invention it will be understood that the use of a pure homogeneous low boiling hydrocarbon is not essential and that in practice there would be used mixtures of the low boiling hydrocarbons such as would be obtained in cracking petroleum, or as might be derived from the stripping of natural gas; thus it will be understood that where in the claims appended hereto reference is made to a low boiling hydrocarbon, I intend to include such mixture of low boiling hydrocarbons as well as any of the low boiling hydrocarbons mentioned herein, or operable equivalents thereof.

It will be understood that where herein reference is made to low boiling hydrocarbons I contemplate hydrocarbons having a boiling point below about 15° C. at atmospheric pressure (760 mm. mercury). It will be understood that mixtures of low boiling hydrocarbons may be used and in such case it will be understood that I contemplate mixtures of a character such that the greater portion thereof will distill below 15° C. at atmospheric pressure.

Having now fully described my invention, what I claim and desire to protect under Letters Patent is:

1. The method for producing a high grade rosin which includes subjecting impure rosin to treatment with a liquid paraffin hydrocarbon boiling below about 15° C. at atmospheric pressure in sufficient quantity to dissolve substantially pure rosin therefrom, separating the hydrocarbon-rosin solution formed from the undissolved components of the rosin and then separating the hydrocarbon from the rosin dissolved therein.

2. The method for producing a high grade rosin which includes subjecting impure rosin to treatment with a liquid paraffin hydrocarbon boiling below about 15° C. at atmospheric pressure in sufficient quantity and heat under atmospheric pressure to dissolve substantially pure rosin therefrom, separating the hydrocarbon-rosin solution formed from the undissolved components of the rosin and then separating the hydrocarbon from the rosin dissolved therein.

3. The method for producing a high grade rosin which includes subjecting impure rosin to treatment with a liquid paraffin hydrocarbon boiling below about 15° C. at atmospheric pressure by heating under pressure in sufficient quantity to dissolve substantially pure rosin therefrom, separating the hydrocarbon-rosin solution formed from the undissolved components of the rosin and then separating the hydrocarbon from the rosin dissolved therein.

4. The method for producing a high grade rosin which includes subjecting wood rosin to the action of a liquid paraffin hydrocarbon boiling below about 15° C. at atmospheric pressure by heating under pressure in sufficient quantity to dissolve substantially pure rosin therefrom, separating the hydrocarbon-rosin solution formed from the undissolved components of the wood rosin and then separating the hydrocarbon from the rosin dissolved therein.

5. The method for producing a high grade rosin which includes subjecting impure rosin to treatment with liquid butane in sufficient quantity to dissolve substantially pure rosin therefrom, separating the butane-rosin solution from the components of the rosin undissolved in the butane and then separating the butane from the rosin dissolved therein.

6. The method for producing a high grade rosin which includes heating an impure rosin under pressure with liquid butane in sufficient quantity to dissolve substantially pure rosin therefrom, separating the butane-rosin solution from the components of the dark rosin undissolved in the butane and then separating the butane from the rosin dissolved therein.

7. The method for producing a high grade rosin which includes heating wood rosin under pressure with liquid butane in sufficient quantity to dissolve substantially pure rosin therefrom, separating the butane-rosin solution from the components of the wood rosin undissolved in the butane and then separating the butane from the rosin dissolved therein.

8. The method for producing a high grade rosin which includes dissolving a dark colored rosin in gasoline, admixing with the gasoline-rosin solution a low boiling point hydrocarbon of substantially lower boiling point at atmospheric pressure than gasoline in amount sufficient to precipitate color bodies from the solution, filtering off the precipitate, and separating the hydrocarbons from the rosin dissolved therein.

9. A method for producing a high grade rosin which includes subjecting impure rosin to treatment with a mixture of hydrocarbons the major portion of which boils below about 15° C. at atmospheric pressure in sufficient quantity to dissolve substantially pure rosin therefrom, separating the hydrocarbon-rosin solution formed from the undissolved components of the rosin, and then separating the hydrocarbons from the rosin dissolved therein.

10. A method for producing a high grade rosin which includes dissolving an impure rosin in a petroleum hydrocarbon, admixing with the petroleum hydrocarbon-rosin solution a paraffin hydrocarbon boiling below about 15° C. at atmospheric pressure in amount to effect precipitation of impurities of the rosin from the solution, filtering off the precipitate, and separating the hydrocarbons from the rosin dissolved therein.

11. The method for producing a high grade rosin which includes dissolving the dark colored rosin in a liquid hydrocarbon, a solvent for the rosin, admixing with the solution formed a hydrocarbon having a boiling point at atmospheric pressure substantially lower than the first mentioned hydrocarbon in amount sufficient to precipitate color bodies from the solution of rosin and the first mentioned hydrocarbon, filtering off the precipitate and separating the hydrocarbons from the rosin.

In testimony of which invention, I have hereunto set my hand, at Kenvil, New Jersey, on this 19th day of October, 1927.

IRVIN W. HUMPHREY.